United States Patent [19]

Harris

[11] E Re. 28,545

[45] Reissued Sept. 2, 1975

[54] SELF-EJECTING ELECTRIC PLUG

[75] Inventor: Lee M. Harris, Amarillo, Tex.

[73] Assignee: Gould, Inc., Chicago, Ill.

[22] Filed: Sept. 20, 1973

[21] Appl. No.: 399,141

Related U.S. Patent Documents

Reissue of:

[64] Patent No.: 3,609,635
Issued: Sept. 28, 1971
Appl. No.: 754,188
Filed: Aug. 21, 1968

[52] U.S. Cl. ..... 399/45 R; 339/196 R; 60/25

[51] Int. Cl. ..... H01r 13/62

[58] Field of Search ..... 339/45; 60/25, 98, 98 RD; 52/1; 292/201, 144

[56] References Cited

UNITED STATES PATENTS

| | | | |
|---|---|---|---|
| 2,427,390 | 9/1947 | Dear | 339/45 R X |
| 2,548,708 | 4/1951 | Dickey | 60/25 |
| 2,597,890 | 5/1952 | Monk | 60/25 |
| 2,612,419 | 9/1952 | Reynolds | 92/94 |
| 2,688,734 | 9/1954 | Welling | 339/45 |
| 3,084,901 | 4/1963 | Thorburn | 251/61.4 |
| 3,168,805 | 2/1965 | Fleury | 60/25 |

*Primary Examiner*—Richard E. Moore
*Attorney, Agent, or Firm*—Donnelly, Maky, Renner & Otto

[57] ABSTRACT

The plug includes a plunger normally spring retracted between the prongs and a chamber containing thermally expansible material and an electric heater which is the plug cord circuit, a remote switch closure energizing the heater to expand the material against the plunger to drive it outwardly and eject the plug from the receptacle.

8 Claims, 3 Drawing Figures

INVENTOR
LEE M. HARRIS

BY
Oberlin, Maky, Donnelly & Renner
ATTORNEYS

SELF-EJECTING ELECTRIC PLUG

Matter enclosed in heavy brackets [ ] appears in the original patent but forms no part of this reissue specification; matter printed in italics indicates the additions made by reissue.

---

This invention relates to an electric plug which can eject itself from a receptacle for self-disconnect action.

The copending application of John T. Venaleck, Ser. No. 689,663, filed Dec. 11, 1967 and now Pat. No. 3,475,715 issued Oct. 28, 1969, discloses a plug assembly on this order in which the ejection is under the control of a solenoid included in the circuit which is energized by connection of the plug in the receptacle. More particularly, this assembly comprises a plunger between the contact prongs which is normally biased outwardly by a spring and mechanically latched within the plug when pushed in by the insertion of the plug in the receptacle. The solenoid, when its circuit is completed by closure of a switch, withdraws the latch, thereby freeing the plunger for outward drive by its spring and hence the ejection of the plug from the receptacle.

One primary area of interest for this plug has been in electric cords for portable appliances used in the home, with the vacuum cleaner being a prime example, and it has been found that the variation in receptacles, especially throughout older homes, is even greater than was expected, with the result that the plug for this application required a fairly heavy spring force for reliable ejection. Increasing spring force for course requires proportionately more pressure by the housewife in the insertion of the plug in the receptacle, with the latch necessarily stronger, the solenoid larger, and the overall size increased.

It is a principal object of the present invention to provide such a plug with an improved ejector mechanism having appreciably greater capacity without the noted shortcomings of the solenoid plug form.

Another object is to provide an improved self-ejecting plug which is inexpensive to produce and relatively trouble free by virtue of simplicity of its design and operating mode.

*A further object is to provide a thermally actuated device that is rapid and efficient in converting electrical energy to mechanical energy.*

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
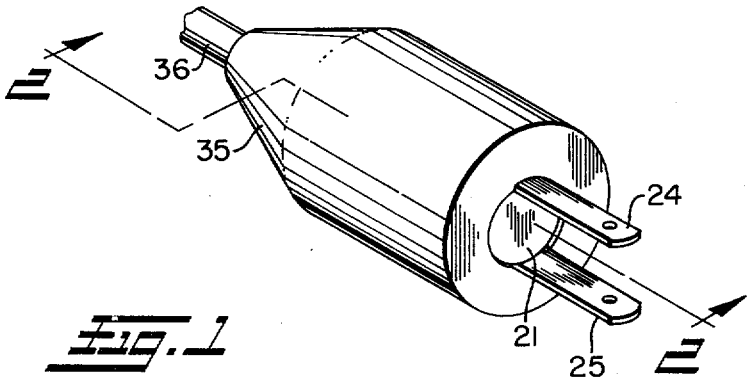
FIG. 1 is a perspective view of a new self-ejecting electric plug in accordance with the present invention.
Figure 2:
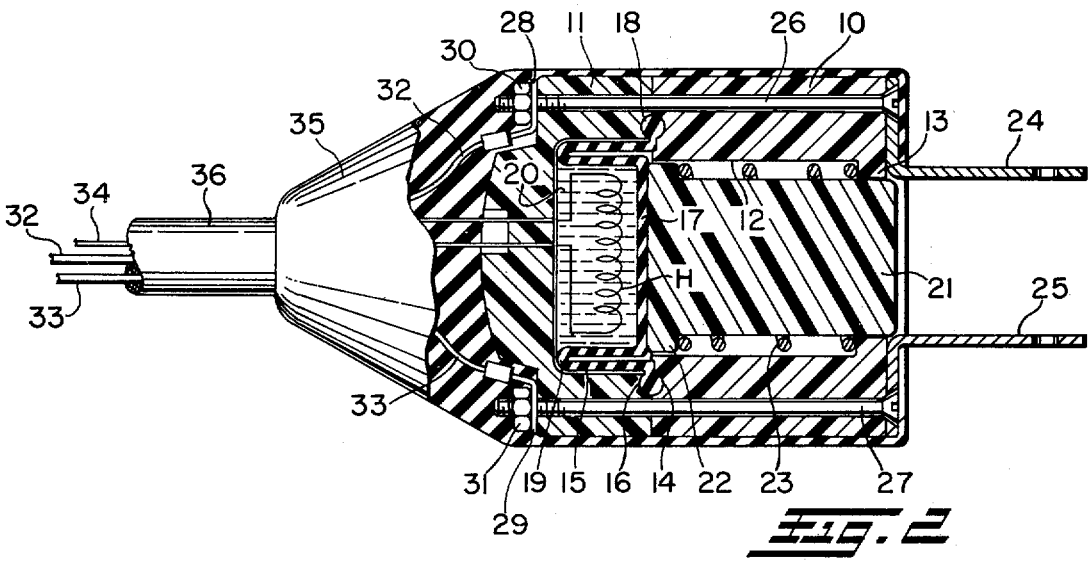
FIG. 2 is a longitudinal sectional view of the plug as indicated by the line 2—2 in FIG. 1.

Referring now to the drawing in detail, the plug comprises first and second body parts 10 and 11, which are preferably made of rigid plastic. The part 10 is generally annular, thereby defining a bore 12, with a radial stop flange 13 at the outer end of the bore and an annular relief 14 in the inner end face for purposes to be described.

The part 11 is in the nature of an end cap having a cylindrical recess 15 on the same axis as the bore 12 with a slightly larger inside diameter as shown. The outer or open end of the part 11 abuts the inner end of the part 10, with the two having the same outside diameter, and the end face of the former has a groove 16 opposed to the annular relief 14 in the end face of the latter.

An elastic diaphragm 17, made for example of rubber, is arranged as a wall separating the recess 15 from the adjoining bore 12 and sealing the joint between the parts 10 and 11 by having a peripheral bead 18 sealingly gripped in the groove 16 and relief 14. The diaphragm preferably has a fold 19 which it normally assumes and which permits ready distension of the diaphragm outwardly into the bore 12.

The recess contains a quantity of thermally expansible and contractable material 20 and a schematically shown electric heating coil H operative when energized to expand such material and thereby exert an outward force at the diaphragm 17.

Figure 3:
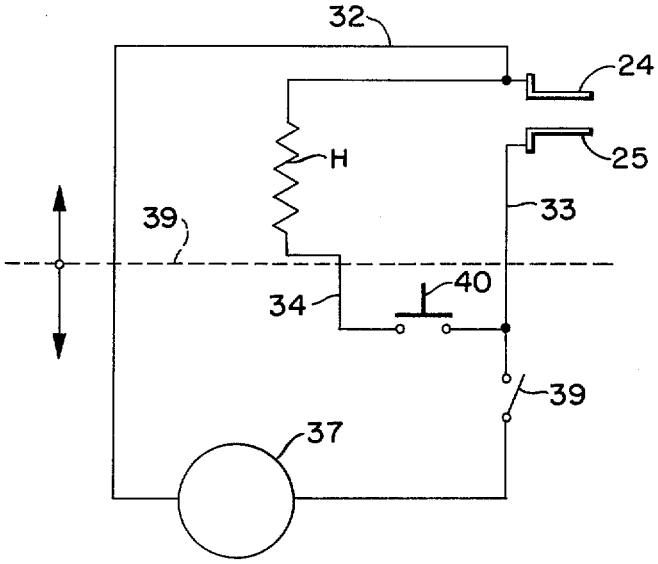
FIG. 3 is an electrical schematic of a plug and appliance combination.

Such force is applied through the diaphragm to a plunger 21 in the bore 12, also made of a rigid plastic, having a flange 22 at its inner end. A return spring 23 extends from this plunger flange to the stop flange 13 at the outer end of the bore 12 and serves normally to hold the plunger in the relatively retracted condition shown. Two metal prongs 24, 25 are attached to the outer face of the body part 10 by bolts 26, 27 which extend completely through this part and also through the part 11 at the rear of which they receive electric wire terminals 28, 29 and nuts 30, 31. Accordingly, the bolts serve also to unite the body parts 10 and 11 and electrically connect the prongs 24, 25 respectively to the terminals 28, 29. The plunger is between the prongs, and two wires 32, 33 extend from the terminals 28, 29. As shown in the schematic of FIG. 3, one end of the heating coil H is connected to wire 32, while the other continues as a third wire 34. The plug assembly is encased within an insulative cover 35, for example, of rubber molded thereabout, and the wires 32, 33 and 34 extend through an insulative cord body 36 to the appliance or other device served by the cord.

In the FIG. 3 schematic, the circle 37 represents an electrical appliance and dashed line 38 the division between the plug circuit, above the line, and the cord and appliance circuit. The latter includes an on-off switch 39 and additionally a pushbutton switch 40 connected between wires 33 and 34, so that the heating coil in the plug can selectively be energized by closure of the pushbutton conveniently at the appliance.

When a housewife operating the appliance wishes to disconnect the plug from the circuit, she need only close the heater switch 40, with the resulting heating of the thermally expansive material 20 in the plug almost immediately effective to force the plunger 21 outwardly against the return spring force for automatic ejection of the plug from the receptacle. Such material is selected to provide quick response within substantially normal plug size and it has been found that Freon, a halogenated hydrocarbon containing a fluorine atom, is very satisfactory in this respect and also in recycling.

The inert, dielectric liquid will vaporize [art] *at* about 200° F., and that part of the liquid contacted by and proximate to the heater in the plug can be almost immediately heated to this temperature sufficiently to develop ejection force with a relatively small resistance element at normal energization. For example, a plunger force well over the 15 lbs. which appears reliable for ejection from household sockets, has been developed in less than 1 second with a heater of about 470 watts at 115 volts.

When the plug is ejected, the circuit for the heater in the same is also automatically disabled along with the appliance or other cord connected device, the expansion material as quickly contracts and the return spring retracts the plunger to its normal nonobstructive position. The power output is substantial and more than adequate readily to effect disconnection of even a tightly held plug.

It will also be apparent that the number and character of the components permit economic manufacture with high efficiency and reliability. While the heating coil has been shown schematically for convenience of illustration, it can in fact be a simple wire coil of sufficient heating capacity relative to the fluid or material used to perform with the desired quick response.

While the plug part of the plug-receptacle combination is preferably the actuated part in the described application, it will be appreciated generally that such an automatic disconnect can also be realized comparably by incorporating the ejecting assembly in the receptacle, with the plunger in this case normally retracted between the socket contacts and driven outwardly against the plug to eject the latter.

Other modes of applying the principle of the invention may be employed, change being made as regards the details described, provided the features stated in any of the following claims or, the equivalents of such be employed.

I, therefore, particularly point out and distinctly claim as my invention:

1. A thermally actuated device for converting electrical energy rapidly to mechanical energy by volume and pressure increase due to a liquid to gas phase change of a working fluid, comprising body means, a distensible member in sealed engagement with said body means forming a fluid chamber therewith, said distensible member including an annular fold therein projecting into said fluid chamber and adapted for unfolding upon an increase of pressure in said fluid chamber, said distensible member having a central portion supported by said annular fold adapted for substantially linear movement away from and toward said body means, an inert dielectric fluorinated hydrocarbon liquid filling said fluid chamber when said distensible member is in a folded condition, electrical resistance heating means supported in said body means, being disposed in said fluid chamber and completely submerged in said liquid for heating that portion of said liquid in contact therewith to vaporization temperature, thereby to raise the pressure in said fluid chamber and cause movement of said distensible member and further comprising means for confining said distensible member for such substantially linear movement, said confining means being exterior of said body means and rigidly connected thereto.

2. A thermally actuated device as set forth in claim 1 further comprising a plunger supported for linear movement in said confining means, said plunger being in abutment with said central portion of said distensible member, and a spring in enggement with said plunger for urging same against said distensible member.

3. A thermally actuated device as set forth in claim 2 wherein said distensible member is a rubber diaphragm adapted for distension without stretching, by rolling along said annular fold therein, thereby providing substantially no resistance to movement of said central portion.

4. A thermally actuated device as set forth in claim 3 wherein said body means comprises a rigid cup and said diaphragm is secured at the mouth of said cup, said annular fold being fully received within said cup and adapted for unfolding exteriorly thereof to provide linear movement of said central portion greater than the depth of said cup.

5. A thermally actuated device as set forth in claim 4 wherein said confining means comprises a cylindrical member rigidly secured to said cup and adapted for support of said plunger and said spring.

*6. A thermally actuated device for converting electrical energy rapidly to mechanical energy by volume and pressure increase due to a gas producing phase change of a working medium, comprising a body, extensible means in sealed engagement with said body for forming a variable volume working medium chamber therewith, said means adapted for enlargement of the latter upon an increase of pressure therein, said means being supported for movement away from and toward said body, a thermally expansive working medium substantially filling said chamber when said means is in its non-extended condition relative to said body, electrical resistance heating means within said body, being disposed in said chamber and completely surrounded by said working medium for heating that portion of said working medium in contact therewith to a temperature at which a gas producing phase change occurs, thereby to raise the pressure in said chamber and cause movement of said extensible means, and further means for confining said extensible means for substantially linear movement thereof, said further means being exterior of said body and rigidly connected thereto.*

*7. A thermally actuated device for converting electrical energy rapidly to mechanical energy by volume and pressure increase due to a liquid to gas phase change of a working fluid, comprising a body, extensible means in sealed engagement with said body for forming a variable volume fluid chamber therewith, said means adapted for enlargement of the latter upon an increase of pressure therein, said means being supported for movement away from and toward said body, an inert dielectric fluorinated hydrocarbon liquid substantially filling said fluid chamber when said means is in its non-extended condition relative to said body, electrical resistance heating means within said body, being disposed in said fluid chamber and completely submerged in said liquid for heating that portion of said liquid in contact therewith to vaporization temperature, thereby to raise the pressure in said fluid chamber and cause movement of said extensible means, and further comprising means for confining said extensible means for such substantially linear movement, said further means being exterior of said body and rigidly connected thereto.*

*8. A thermally actuated device for converting electrical energy rapidly to mechanical energy by volume and pressure increase due to a gas producing phase change of a*

*working medium, comprising a body, a distensible member in sealed engagement with said body forming a variable volume working medium chamber therewith, said distensible member including an annular fold therein projecting into said chamber and adapted for unfolding upon an increase of pressure therein, said distensible member having a central portion supported by said annular fold adapted for substantially linear movement away from and toward said body, a thermally expansive working medium substantially filling said chamber when said distensible member is in a folded condition, electrical re-*

*sistance heating means within said body, being disposed in said chamber and completely surrounded by said working medium for heating that portion of said working medium in contact therewith to a temperature at which a gas producing phase change occurs, thereby to raise the pressure in said chamber and cause movement of said distensible member, and further comprising means for confining said distensible member for such substantially linear movement, said means being exterior of said body and rigidly connected thereto.*

* * * * *